(12) United States Patent
Fouts

(10) Patent No.: US 6,196,364 B1
(45) Date of Patent: Mar. 6, 2001

(54) BRAKE BLEEDER CHECK VALVE

(75) Inventor: Robert E. Fouts, Rancho Palos Verdes, CA (US)

(73) Assignee: Holley Performance Products, Bowling Green, KY (US)

( * ) Notice: Subject to any disclaimer, the term of this patent is extended or adjusted under 35 U.S.C. 154(b) by 0 days.

(21) Appl. No.: 09/227,079

(22) Filed: Jan. 5, 1999

(51) Int. Cl.[7] ..................................................... B60T 11/00
(52) U.S. Cl. ...................................... 188/352; 137/614.19
(58) Field of Search ........................... 188/352; 137/613, 137/614.19; 251/215

(56) References Cited

U.S. PATENT DOCUMENTS

| | | | |
|---|---|---|---|
| 2,771,093 | * 11/1956 | Wilson | 137/614.17 |
| 4,989,638 | 2/1991 | Tervo | 137/614.01 |
| 4,989,639 | * 2/1991 | Sulwer | 137/614.17 |
| 5,441,203 | * 8/1995 | Swan | 239/574 |

* cited by examiner

Primary Examiner—Robert Oberleitner
Assistant Examiner—C. T. Bartz
(74) Attorney, Agent, or Firm—Hunton & Williams

(57) ABSTRACT

A brake bleeder check valve comprises an elongated valve body and a valve seat member. The elongated valve body has an externally threaded cylindrical wall portion, and is integral with a nut portion and hose connecting portion at a first end, and a cylindrical portion at a second end. The cylindrical portion has a plurality of openings therein which are in fluid communication with a throughbore that extends through the elongated valve body. The valve seat member comprises a tapered valve seat portion integral with a cylindrical elongated portion. The cylindrical elongated portion is receivable in a coiled spring that is loosely receivable in the throughbore that extends through the elongated valve body.

6 Claims, 3 Drawing Sheets

BRAKE BLEEDER CHECK VALVE

BACKGROUND OF THE INVENTION

1. Field of the Invention

The invention relates to brake bleeder check valves, and more particularly to valves used to bleed hydraulic fluid lines of hydraulic brake systems.

2. Description of the Related Art

Brake bleeder valves of this kind which are presently known have the disadvantage that the passageway through the valve body in which the check valve mechanism is located opens directly into the hydraulic cylinder or chamber of the system located at each wheel. If the check valve leaks, hydraulic fluid can flow directly from the system out through the bleeder valve. Some attempts to correct this problem have provided such things as a two piece bleeder valve, in which one piece is a cap that can be tightened and loosened relative to the other piece that is screwed into the housing of the hydraulic cylinder or chamber. The one piece which is screwed into the housing has a first hemi-spherical valve seat to receive the bottom half of a ball check valve, and the cap has a second hemi-spherical valve seat to receive the top hand of the ball check valve. When the cap is screwed down tight on the other piece, the ball check valve is thereby held in the valve seat in the valve closed position. In the event a stripped thread or obstruction of some kind prevents the cap from being fully and completely tightened, the ball check valve remains loose with only a spring biasing it toward the valve closed position. When the brakes of the vehicle are applied thereby pressurizing the hydraulic fluid in the lines, such pressurized fluid enters the passageway of this prior art type of bleeder valve which opens directly into the system. The pressurized fluid can become strong enough to overcome the bias of the spring holding the check valve in place, whereby fluid can leak out through the bleeder valve.

In U.S. Pat. No. 4,989,638, a one-piece valve is disclosed in which the entrance of the passageway through the valve body is in the side wall of the valve body and is not in communication at all with the hydraulic cylinder or chamber of the hydraulic system when the bleeder valve body is in its tightened and closed position. In this type of bleeder valve body construction, no separate mechanism is needed to hold the check valve in place since pressurized hydraulic fluid cannot reach the check valve and force it open until the one-piece valve body itself has been loosened enough to permit hydraulic fluid to flow out of the closed system into the bleeder valve recess whereby it can then enter the side wall entrance of the bleeder valve body.

Most commercial shops typically use an expensive pressure bleeder which, if used improperly, can introduce air bubbles into the vehicle brake system through cavitation. Vacuum bleeders are less expensive but also can introduce air into the system.

There is a need for a replacement bleeder valve for original equipment bleeders which allows one person to safely bleed vehicle brakes without a mess and with no chance of air inclusion.

SUMMARY OF THE INVENTION

It is an object of this invention to provide a brake bleeder check valve which can be operated by one person to bleed brakes safely without any chance of air inclusion.

It is a further object of this invention to carrying out the foregoing object wherein the valve remains seated in the seat leading to the brake caliper during bleeding of the brakes yet permits brake fluid to flow therepast to the expelled fluid container.

These and other objects are preferably accomplished by providing a brake bleeder check valve comprising an elongated valve body and a valve seat member. The elongated valve body has an externally threaded cylindrical wall portion, and is integral with a nut portion and hose connecting portion at a first end, and a cylindrical portion at a second end. The cylindrical portion has a plurality of openings therein which are in fluid communication with a throughbore that extends through the elongated valve body. The valve seat member comprises a tapered valve seat portion integral with a cylindrical elongated portion. The cylindrical elongated portion is received in a coiled spring that is in turn loosely received in the throughbore extending through the elongated valve body.

DESCRIPTION OF THE PREFERRED EMBODIMENT

Figure 1:
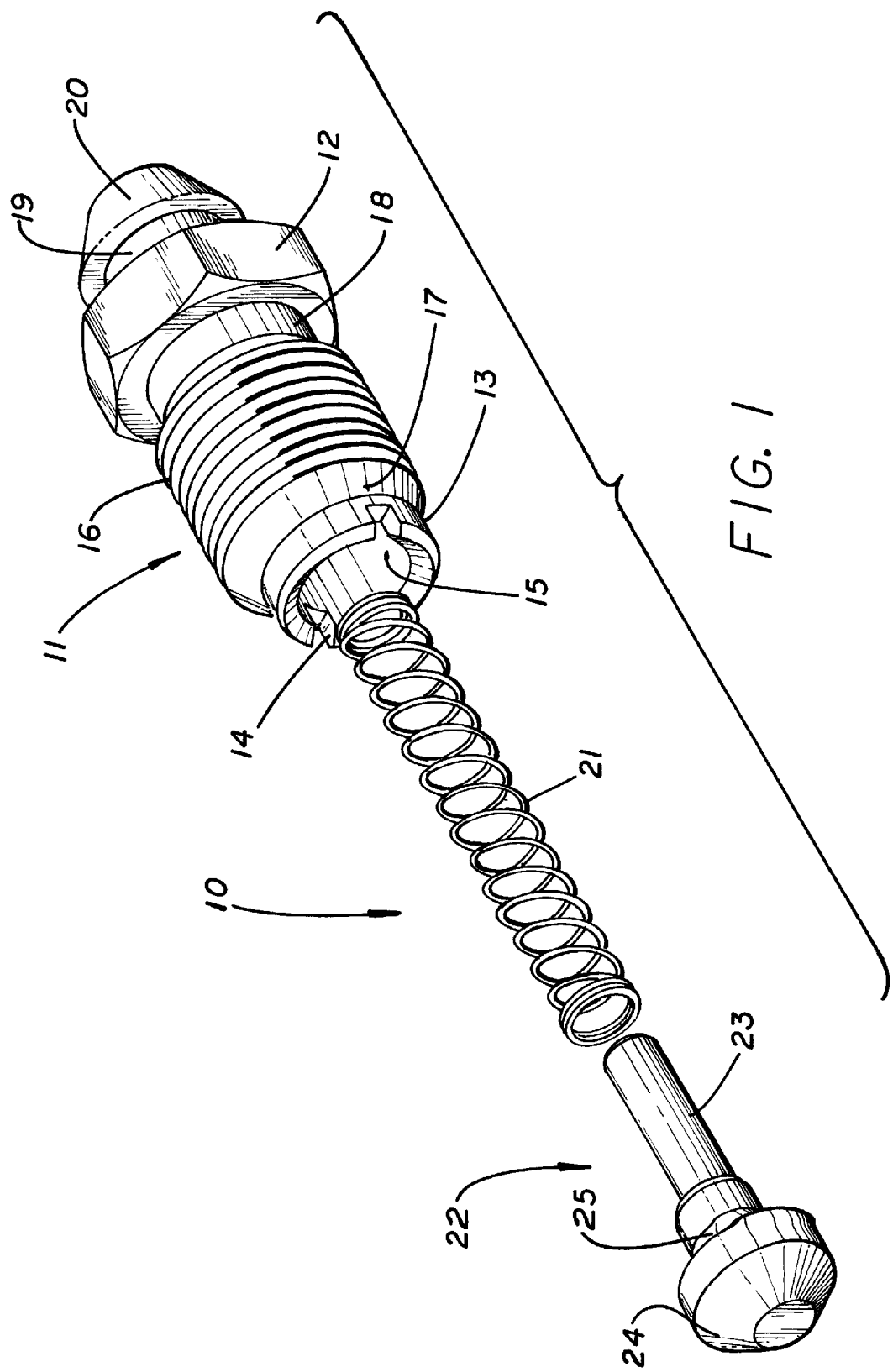
FIG. 1 is an exploded view of a bleeder check valve in accordance with the teachings of the invention.

Referring now to FIG. 1 of the drawings, a brake bleeder check valve 10 in accordance with the teachings of the invention is shown. Valve 10 has an elongated generally cylindrical valve body 11 having a hex nut portion 12 at one end and an integral generally cylindrical portion 13 at its other end. Cylindrical portion 13 has a plurality of spaced slots 14 therein in fluid communication with the throughbore 15 through valve body 11. In the embodiment illustrated in FIG. 1, two spaced slots 14 are illustrated in cylindrical portion 13. As seen, a portion of cylindrical valve body 11 is threaded, as at threaded portion 16, between nut portion 12 and cylindrical portion 13. A tapered portion 17 leads from threaded portion 16 to cylindrical portion 13. A smooth cylindrical integral portion 18 interconnects nut portion 12 and threaded portion 16. Nut portion 12 is greater in outer diameter than threaded portion 16. An integral extension portion 19 leads from nut portion 12 terminating in an integral tapered and bulbed expelled brake fluid hose connecting member 20.

Valve 10 further includes a coiled spring 21 loosely receivable in throughbore 15. A valve seat member 22 is also provided having a generally cylindrical elongated portion 23 integral with a tapered valve seat portion 24. Valve seat portion 24 may be tapered on its underside, as at taper 25 and elongated portion 23 is of a diameter generally related to the inner diameter of spring 21 so that it is insertible therein.

Figure 2:
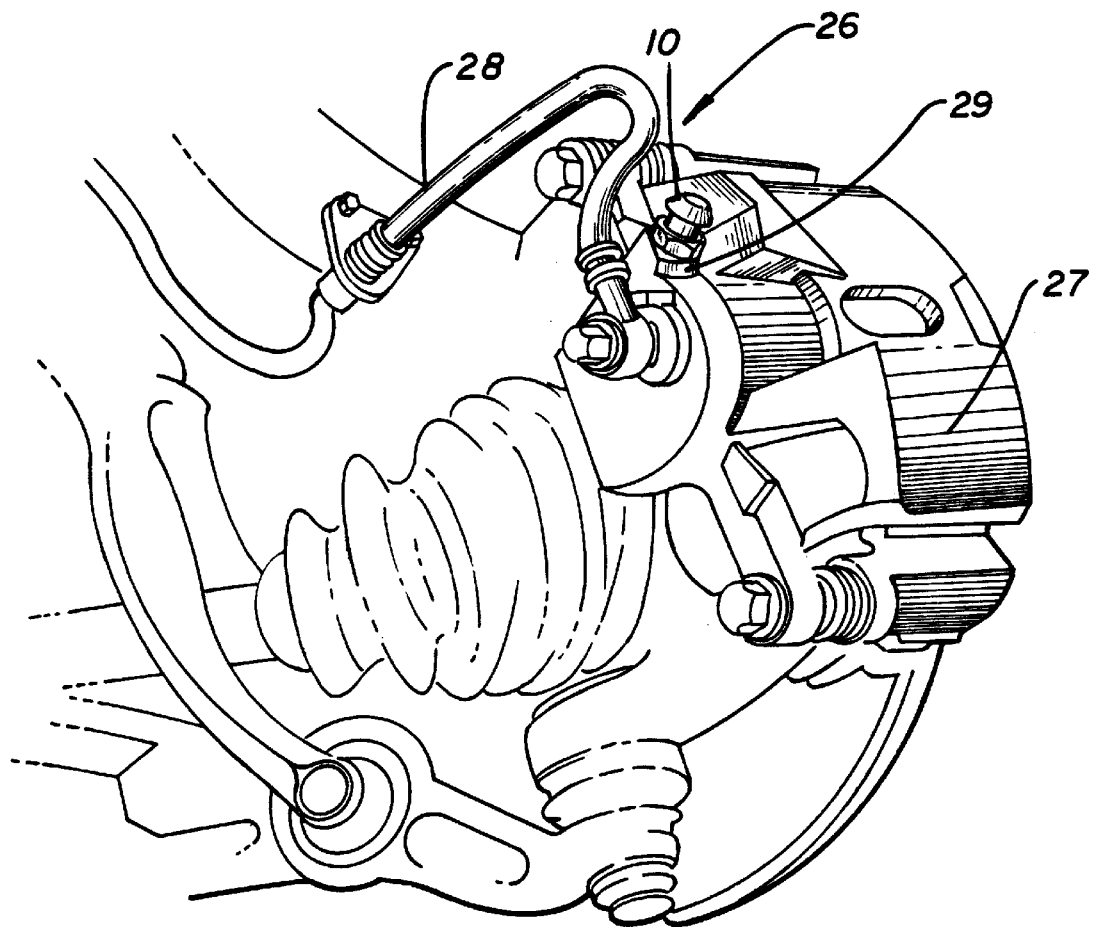
FIG. 2 is a perspective view of a brake bleeder check valve in accordance with this invention installed in the receiving recess in the housing of a brake caliper, the check valve shown in the check valve closed position prior to connection of a discharge hose thereto.

As seen in FIG. 2, a conventional vehicle brake system 26 is shown having a caliper 27 with a pressure brake fluid hose 28 leading thereto. Bleeder valve 10, in accordance with the invention, is shown mounted in a threaded valve recess 29 as is well known in the art.

Figure 3:
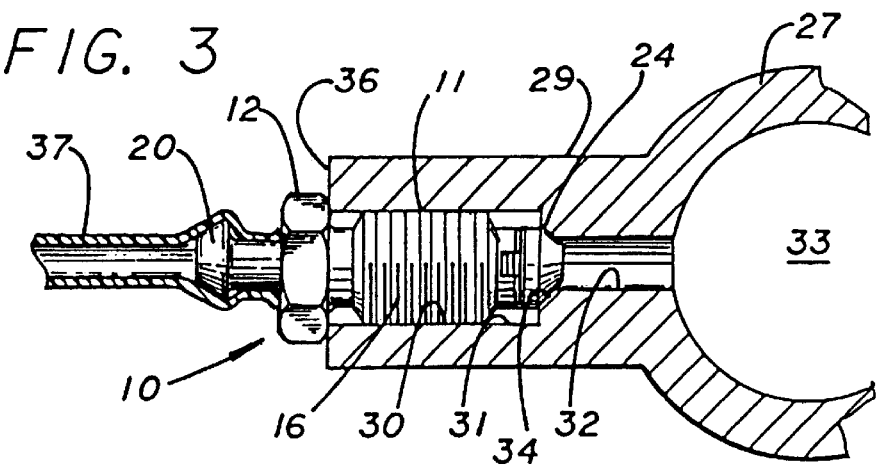
FIG. 3 is a sectional view of the brake bleeder check valve of FIGS. 1 and 2 and a portion of the caliper of FIG. 2 having a discharge hose coupled thereto, the valve in the seated closed position.

Referring now to FIG. 3, a portion of caliper 27 is shown with valve recess 29 leading into the interior thereof. Valve recess 29 is threaded on its interior, at threaded section 30, the threads thereof mating with the threads of threaded portion 16 of check valve 10. Threaded section 30 leads into a valve seat section 31 of lesser diameter than the diameter of threaded section 30. Valve seat section 31 leads into an elongated passageway 32 opening into the interior of chamber 33 of caliper 27. As seen in FIG. 3, a tapered area 34 interconnects passageway 32 and section 31 providing the seat for valve seat portion 24 of valve 10.

Tightening of nut portion 12 forces valve seat portion 24 into the sealing position shown in FIG. 3 against the bias of spring 21.

A flexible bleed hose 37 is shown attached to brake fluid hose connecting member 20. Hose 37 conducts the brake fluid expelled during the bleeding process to a suitable container (not shown).

In operation, the normal closed position of check valve 10 is shown in FIG. 3. When it is desired to bleed the brakes to get air out of the caliper or out of the brake hose, hose 37 is attached to hose connecting member 20 as shown in FIG. 3.

A bleeder valve 10 is provided in each brake caliper of each wheel to bleed the hydraulic fluid lines for the purpose of removing air which may have gotten into the lines of such as during a brake repair operation or replacement of a master cylinder or part thereof. In order to bleed the lines and expel any air that has gotten in, as seen in FIG. 4, the bleeder valve body 11 is loosened by applying a wrench to the hexagonal nut portion 12 and rotating until body 11 backs partially out of valve recess 29.

Hydraulic fluid can then flow out of the fluid chamber 33 into the inlet 32.

Figure 4:
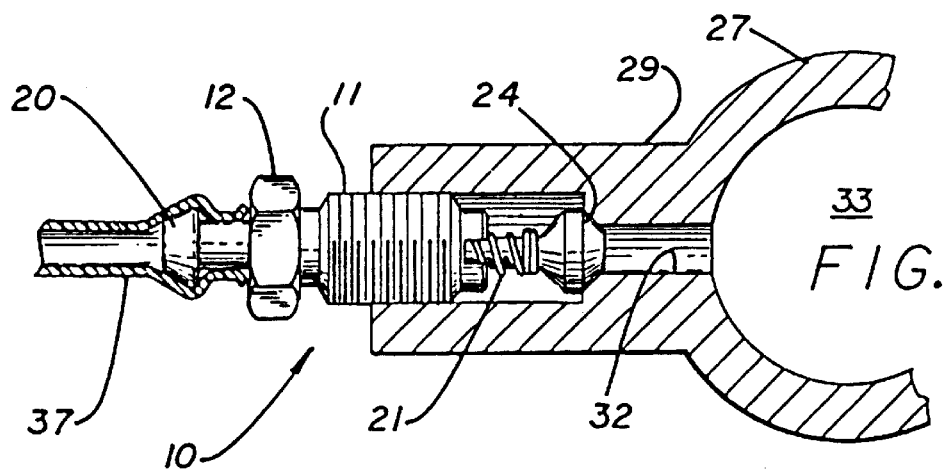
FIG. 4 is a view similar to FIG. 3 illustrating a second step in the operation thereof.

Further flow of the hydraulic fluid is blocked by the valve seat portion 24 seated in the valve seat 34 and held therein by the bias of compression spring 21 (FIG. 4).

Figure 5:
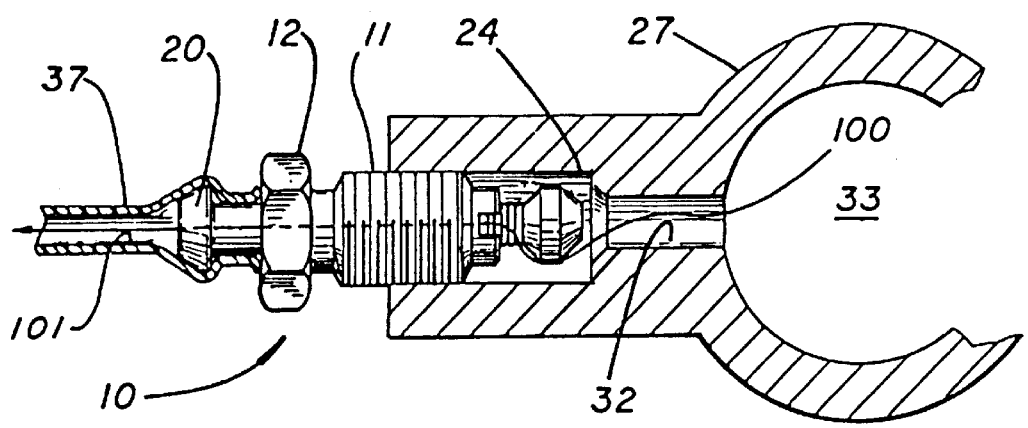
FIG. 5 is a view similar to FIG. 3 illustrating a final step in the operation thereof.

The next step in the brake bleeding operation is for an operator in the vehicle to press down on the brake pedal which causes the master cylinder to pressurize the hydraulic fluid in the line leading to the brake cylinder chamber 33 forcing hydraulic fluid under pressure to the bleeder valve body 11. Such pressure is sufficient to force the valve seat portion 24 out of the valve seat 34 whereby hydraulic fluid and any air in the line is expelled past valve seat portion 24 entering slots 14 and through valve body threaded portion 16 and into and out through bore 101 as seen in FIG. 5 and indicated by arrow 100.

When the pressure from the first depression of the brake pedal is exhausted, the compression spring 21 biases the valve seat portion 24 back to the valve seat 34 to prevent leakage of hydraulic fluid until the operator has let the brake pedal out and it is depressed again to apply a second flow of pressurized hydraulic fluid and any air still in the lines. This causes the valve seat portion 24 to again separate from the valve seat 34 to expel additional air and hydraulic fluid. As the pressure from such second flow of pressurized hydraulic fluid and air is dissipated, the spring 21 again biases the valve seat portion 24 back to the valve seat 34 to prevent leakage of hydraulic fluid. This process can be repeated until all of the air has been expelled from the hydraulic brake lines.

When all of the air has been expelled from the hydraulic brake lines, the bleeder valve body 16 is screwed back into its closed position in the bleeder valve recess 29 with the tapered valve seat portion 24 seated tightly in the corresponding converging wall portion or the bore seat 34 of the bore 40 of the bleeder valve recess 29. This prevents further hydraulic fluid flowing from the fluid chamber 33 of brake cylinder housing 27 into the bleeder valve recess 29 and from reaching the interior of valve body 11. Any air bubbles in the brake hose line or caliper are removed. Air and fluid thus exit through supply hose 37 to the expelled fluid container (now shown) as is well known in the art. Such operation is continued until no more air bubbles are present.

One person can safely bleed brakes without a mess and with no chance of air inclusion. There is no need to open and close each bleed screw in sequence as another pumps the brake pedal. Such operation, as in the check valve systems in U.S. Pat. Nos. 4,989,639 and 4,869,292, requires proper procedure and close coordination. Such check valves require that the valve body seal to the threads since the seal is internal. Fluid can seep about the threads. Since applicant's valve remains seated in the recess, fluid cannot seep about the threads but exits through slots 14. These prior art check valves require that thread sealant be placed about the threads to prevent leakage but, after time, such sealant wears away. Applicant's check valve is a solid bleeder valve that seals the passageway leading from fluid chamber 33 and fluid only goes out through slots 14.

The bleeder check valve 10 of this invention has other applications. Such a bleeder check valve may be provided in any suitable hydraulic system or any portion thereof where it is necessary to bleed air out of the system.

Any suitable dimensions may be used depending on the size of the caliper and valve recess. Although a particular embodiment of the invention is disclosed, variations thereof may occur to an artisan and the scope of the invention should be limited only by the scope of the appended claims.

I claim:

1. A brake bleeder check valve (10) and wheel brake caliper (27) combination, wherein said brake bleeder check valve (10) comprises:
an elongated valve body (11) having an externally threaded cylindrical wall portion (16), the elongated valve body (11) being integral with a nut portion (12) and a hose connecting member (20) at a first end, and having an integral tapered portion (17) and a cylindrical portion (13) at a second end, the cylindrical portion (13) having a plurality of openings (14) therein which are in fluid communication with a throughbore (15) that extends entirely through the elongated valve body (11);

a valve seat member (22) comprising a tapered valve seat portion (24) integral with a cylindrical elongated portion (23), the cylindrical elongated portion (23) being receivable in a coiled spring (21) which is loosely receivable in the throughbore (15) and which enables the valve seat member to extend outward from the second end of the elongated valve body;

wherein the wheel brake caliper (27) comprises:
a valve recess (29) having an interior threaded section (30), the valve recess being integral with and leading into a tapered valve seat (34), and an unthreaded passageway (32) in fluid communication with and extending from the valve seat (34) to an interior chamber (33);

wherein rotation of the nut portion (12) allows the externally threaded cylindrical wall portion (16) of the elongated valve body (11) to rotate within the interior threaded section (30) of the valve recess (29) between a first tightened position and a second loosened position;

wherein the first tightened position occurs when the tapered valve seat portion (24) of the elongated valve body (11) is forced into contact with the valve seat (34) to sealingly close the interior chamber (33) of the wheel brake caliper (27);

wherein the second loosened position occurs when the tapered valve seat portion (24) of the elongated valve body (11) is in sealing contact with the valve seat (34) through the bias of the coiled spring (21), until pressure in the interior chamber (33), resulting from a brake pedal being pumped, forces the tapered valve seat portion (24) away from the valve seat (34) by compressing the coiled spring (21), and allowing fluid to flow around the tapered valve seat portion (24) and through the plurality of openings (14) to the hose connecting member.

2. The valve and caliper combination of claim 1, wherein the plurality of openings comprise slots.

3. The valve and caliper combination of claim 1, wherein the cylindrical elongated portion of the valve seat member is loosely disposed within the coiled spring.

4. A brake bleeder check valve comprising:

an elongated valve body (11) having an externally threaded cylindrical wall portion (16), the elongated valve body (11) being integral with a nut portion (12) and a hose connecting member (20) at a first end, and having an integral tapered portion (17) and a cylindrical portion (13) at a second end, the cylindrical portion (13) having a plurality of openings (14) therein which are in fluid communication with a throughbore (15) that extends entirely through the elongated valve body (11); and a valve seat member (22) comprising a tapered valve seat portion (24) integral with a cylindrical elongated portion (23), the cylindrical elongated portion (23) being receivable in a coiled spring (21) which is loosely receivable in the throughbore (15) and which enables the valve seat member to extend outward from the second end of the elongated valve body.

5. The valve of claim 4, wherein the plurality of openings comprise slots.

6. The valve of claim 4, wherein the cylindrical elongated portion of the valve seat member is loosely disposed within the coiled spring.

* * * * *